J. J. ESSEX.

ATOMIZER.

No. 7,705. Reissued May 29, 1877.

Witnesses:
Michael Ryan
Jno. Haynes

Inventor
James J. Essex
by his Attorneys
Brown & Allen

UNITED STATES PATENT OFFICE.

JAMES J. ESSEX, OF NEWPORT, RHODE ISLAND.

IMPROVEMENT IN ATOMIZERS.

Specification forming part of Letters Patent No. 116,286, dated June 27, 1871; reissue No. 7,705, dated May 29, 1877; application filed January 24, 1877.

*To all whom it may concern:*

Be it known that I, JAMES J. ESSEX, of Newport, in the county of Newport, and State of Rhode Island, have invented certain new and useful Improvements in Atomizers, and I do hereby declare that the following is a full, clear, and exact description of the same, reference being had to the accompanying drawing, forming part of this specification.

This invention consists in the combination, with the jet or suction tube of an atomizer, of an attached external vent passing through the same opening in the stopper as the said tube; and the invention further consists in the combination, with the jet or suction tube of an atomizer and a vent thereto, of a drip-cup for collecting the drippings and returning the same to the bottle or vessel containing the liquid to be atomized, which is important in the use of expensive fluids used for medicinal purposes.

Figure 1:
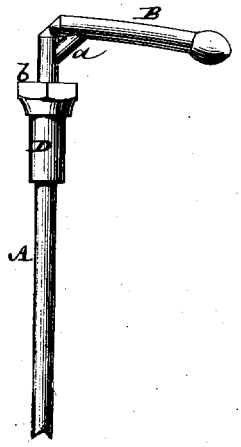
Figure 2:
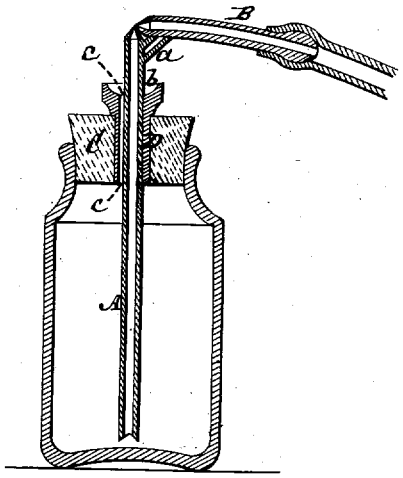
Figure 3:
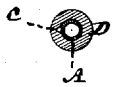

Figure 1 is a side view of my invention applied to a jet or suction tube, and showing also the air or blast tube of an atomizer in working relation with the suction-tube. Fig. 2 is a vertical section of the same, and of a bottle, into the cork of which the vent-containing tube, which also carries the suction-tube, is inserted. Fig. 3 is a transverse section of the suction-tube and its attached vent-containing tube.

The letter A in the accompanying drawing denotes the jet or suction tube of an atomizer, and B the air or blast tube, which tubes are constructed and arranged and connected at *a* in the usual manner. These tubes may be of metal or other material. That portion of the suction-tube A which is received within the cork or stopper C is surrounded by a tube, D, which is soldered or otherwise securely attached to its exterior, such tube, D, being of an internal caliber to fit closely around the suction-tube, but having cut longitudinally through its interior a notch or channel, *c*. This channel, when the tube D is put on or over and secured to the suction-tube, forms a passage outside of the latter, which passage constitutes the vent to secure the proper operation of the atomizer, and, as here arranged, also serves for the return of any drip which may run down the suction-tube from the nozzle thereof. The tube D may consist of a piece of plain tubing. It is here shown, however, as made with an upper drip-cup, *b*, which is in communication with the vent *c*, and which serves to collect drip and return the same by the vent *c* to the liquid-supplying vessel or chamber of the atomizer. Or the piece or tube D may have its upper part provided with a flange broad enough to cover the whole of the cork or stopper and form an ornamental cap thereto.

An atomizer thus constructed or provided with a vent, which is made to carry or to receive through it the suction tube, forms, as it were, a complete instrument which is applicable to any cork or bottle stopper in which there is made a hole of suitable size to receive the vent, thereby doing away with the necessity of making a special stopper, and forming a better or clearer vent, and which may also be the drip-return passage, than is commonly formed by making a vent-hole in a cork.

I claim—

1. The combination, with the jet or suction tube of an atomizer, of an attached external vent passing through the same opening in the stopper as the jet or suction tube, substantially as described.

2. The combination, with the suction or jet tube of an atomizer, of an attached external vent passing through the same aperture in the stopper as the said suction or jet tube, and provided with a drip-cup leading into and forming part of the vent-tube, substantially as herein set forth.

JAMES J. ESSEX.

Witnesses:

EDWARD B. SPERRY,

FRED. HAYNES.